US011982956B2

(12) United States Patent
Kinoshita (10) Patent No.: US 11,982,956 B2
(45) Date of Patent: May 14, 2024

(54) IMAGE FORMING APPARATUS WITH CONTROL OF ROTATION OF ROTOR OF MOTOR THAT DRIVES ROLLER THAT WINDS CLEANING WEB

(71) Applicant: CANON KABUSHIKI KAISHA, Tokyo (JP)

(72) Inventor: Takeshi Kinoshita, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/866,647

(22) Filed: Jul. 18, 2022

(65) Prior Publication Data

US 2023/0030061 A1 Feb. 2, 2023

(30) Foreign Application Priority Data

Aug. 2, 2021 (JP) ................................. 2021-126878

(51) Int. Cl.
G03G 15/20 (2006.01)

(52) U.S. Cl.
CPC ..... G03G 15/2025 (2013.01); G03G 15/2064 (2013.01)

(58) Field of Classification Search
CPC ................................................. G03G 15/2025
See application file for complete search history.

(56) References Cited

U.S. PATENT DOCUMENTS

| 5,970,281 | A  | * | 10/1999 | Park ............... | G03G 21/0041 |
|           |    |   |         |                    | 399/101 |
| 7,630,675 | B2 | * | 12/2009 | Tateishi ........... | G03G 21/0041 |
|           |    |   |         |                    | 399/327 |
| 9,639,036 | B2 | * | 5/2017  | Makino ............ | G03G 15/2025 |
| 11,476,782 | B2 | * | 10/2022 | Itoh ................ | G03G 15/2053 |
| 2008/0138103 | A1 | * | 6/2008 | Nakano ............ | G03G 15/2025 |
|           |    |   |         |                    | 399/327 |
| 2013/0045031 | A1 | * | 2/2013 | Nagata ............. | G03G 15/2025 |
|           |    |   |         |                    | 399/327 |

FOREIGN PATENT DOCUMENTS

JP 2001-282029 A 10/2001
JP 3826786 B2 * 9/2006

OTHER PUBLICATIONS

English translation of JP-3826786 (Year: 2006).*

* cited by examiner

*Primary Examiner* — Arlene Heredia
(74) *Attorney, Agent, or Firm* — Venable LLP (57) ABSTRACT

An image forming apparatus includes a fixing member that fixes, onto a recording material, a toner image that has been transferred onto the recording material, a recovery roller that recovers toner adhering onto the fixing member, a cleaning unit, and a controller. The cleaning unit includes a cleaning web that cleans the recovery roller, a first roller around which the cleaning web is wound in advance, a second roller that winds the cleaning web supplied from the first roller, and a third roller that presses the cleaning web against the recovery roller to clean the recovery roller. The controller stops a rotation of a rotor of a motor that drives the second roller, in a case where a value corresponding to a torque applied to the rotor exceeds a threshold while the rotor is rotating.

11 Claims, 8 Drawing Sheets

IMAGE FORMING APPARATUS WITH CONTROL OF ROTATION OF ROTOR OF MOTOR THAT DRIVES ROLLER THAT WINDS CLEANING WEB

BACKGROUND OF THE INVENTION

Field of the Invention

The present invention relates to an image forming apparatus.

Description of the Related Art

An electrophotographic image forming apparatus includes a fixing device for fixing a toner image formed on a recording material onto the recording material. If the fixing device is jammed, unfixed toner may adhere onto a fixing member (fixing roller) included in the fixing device. Thus, cleaning of the fixing roller may be performed after the recording material causing the jam is removed from the fixing device.

For example, such cleaning is performed by causing the fixing roller to rotate in a state in which a cleaning web (cleaning member) formed from a non-woven fabric is placed in contact with the fixing roller, and wiping away toner adhering onto the fixing roller using the cleaning web. Japanese Patent Laid-Open No. 2001-282029 discloses a technique for supplying a cleaning web from a web-supplying shaft (roller) by turning a web-feeding solenoid on and off via a one-way clutch and thereby causing a web-winding shaft (roller) to rotate.

In an image forming apparatus such as the one described above, a large amount of toner may adhere onto the fixing roller and a recovery roller that is interposed between the fixing roller and the cleaning web and that recovers toner from the fixing roller. For example, a large amount of toner may adhere onto the fixing roller and the recovery roller after a jam is cleared or when the heat quantity necessary for fixing processing is not reached due to an erroneous recording material setting. This leads to an increase in the force of friction between the recovery roller and the cleaning web, which cleans the recovery roller. As a result of this, the recovery roller and the cleaning web pull one another, and tearing of the cleaning web may occur. The tearing of the cleaning web results in image failures because toner adhering onto the fixing roller can no longer be removed. Furthermore, it becomes necessary to replace the cleaning web.

SUMMARY OF THE INVENTION

In view of this, the present invention provides a technique allowing tearing of the cleaning web to be prevented even if the amount of toner adhering onto the recovery roller increases.

According to one aspect of the present invention, there is provided an image forming apparatus comprising: a fixing member that fixes, onto a recording material, a toner image that has been transferred onto the recording material; a recovery roller that recovers toner adhering onto the fixing member; a cleaning unit that includes: a cleaning web that cleans the recovery roller; a first roller around which the cleaning web is wound in advance; a second roller that winds the cleaning web supplied from the first roller; and a third roller that presses the cleaning web against the recovery roller to clean the recovery roller, the cleaning web being fed from the first roller toward the second roller as the second roller rotates; a motor that drives the second roller; a controller configured to control a rotation of a rotor of the motor by controlling a driving current flowing through a winding of the motor; and a detector configured to detect the driving current flowing through the winding, wherein the controller stops the rotation of the motor in a case where a value corresponding to a torque applied to the rotor exceeds a threshold while the rotor is rotating.

Further features of the present invention will become apparent from the following description of exemplary embodiments (with reference to the attached drawings).

BRIEF DESCRIPTION OF THE DRAWINGS

FIGS. 2-1A and 2-1B are diagrams illustrating an example configuration of a fixing device.

FIG. 2-2 is a diagram illustrating the example configuration of the fixing device.

FIG. 4-1 is a block diagram illustrating an example configuration of a load driving circuit.

FIG. 4-2 is a diagram illustrating the relationship between a motor and a rotating coordinate system.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Image Forming Apparatus>

Figure 1:
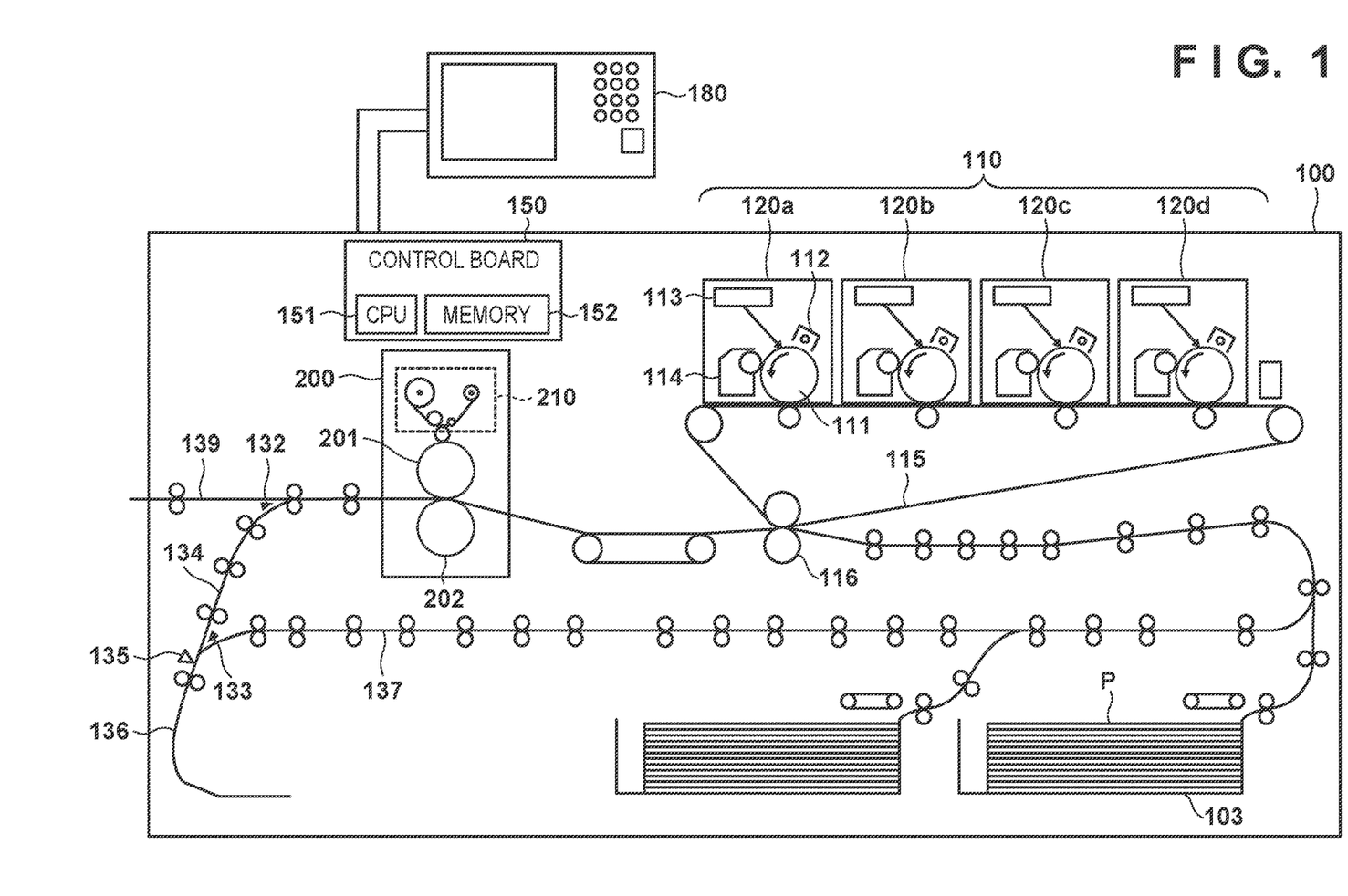
FIG. 1 is a cross-sectional view illustrating an example configuration of an image forming apparatus.
Figures 1A, 2:
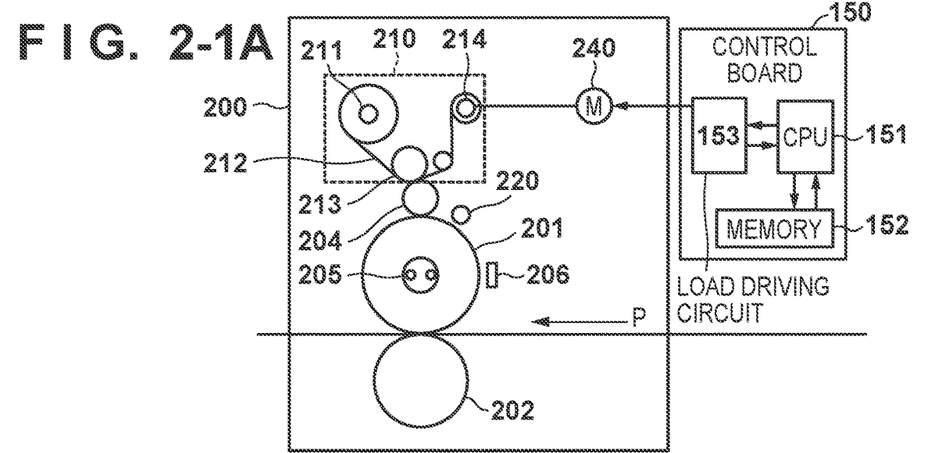
Figures 1B, 2:
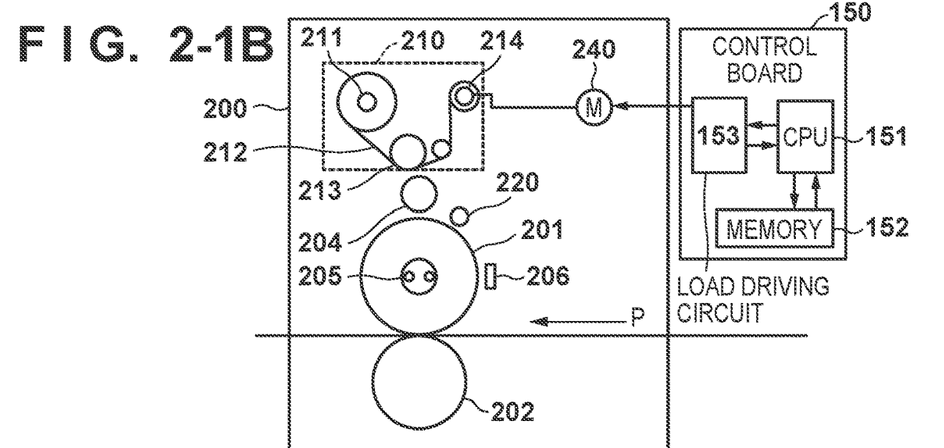

FIG. 1 is a cross-sectional view illustrating an example configuration of an image forming apparatus according to the first embodiment. An image forming apparatus 100 conveys a recording material P accommodated in an accommodating unit 103 to an image forming unit 110, and forms toner images on the recording material P using the image forming unit 110. Subsequently, the image forming apparatus 100 conveys the recording material P having the toner images formed thereon from the image forming unit 110 to a fixing device 200. The fixing device 200 fixes, onto the recording material P, the toner images on the recording material P. For example, the recording material P is a sheet of paper, an OHP sheet, or the like.

The image forming apparatus 100 includes the image forming unit 110, which forms (prints) images on the recording material P. The image forming unit 110 includes four stations 120*a*, 120*b*, 120*c*, and 120*d* each corresponding to a different toner color. The image forming unit 110 further includes an intermediate transfer belt 115 and a transfer roller 116. The stations 120a, 120b, 120c, and 120d respectively form toner images of the colors yellow, magenta, cyan, and black, and transfer the formed toner images onto the intermediate transfer belt 115. In the following, a configuration of the station 120a will be mainly described. However, the stations 120b, 120c, and 120d also have configurations similar to the configuration of the station 120a.

The station 120a includes a photosensitive drum 111, a primary charger 112, a laser unit 113, and a developing device 114. The photosensitive drum 111 is one example of an image carrier, and rotates in the counterclockwise direction (the direction of the arrow) in FIG. 1. The primary charger 112 uniformly charges the surface of the photosensitive drum 111. The laser unit 113 includes a light source that outputs laser light. The laser unit 113 forms an electrostatic latent image on the photosensitive drum 111 by exposing the charged surface of the photosensitive drum 111 to the laser light. The developing device 114 forms a toner image on the photosensitive drum 111 by developing the electrostatic latent image formed on the photosensitive drum 111 using toner (developer). Toner images are similarly formed also on the photosensitive drums of the stations 120b, 120c, and 120d.

The toner images formed on the respective photosensitive drums in the stations 120a, 120b, 120c, and 120d are transferred onto the intermediate transfer belt 115. As the circumferential surface of the intermediate transfer belt 115 moves, the toner images on the intermediate transfer belt 115 move to a transfer position where the toner images are transferred onto the recording material P by the transfer roller 116. The transfer roller 116 transfers the toner images on the intermediate transfer belt 115, onto the recording material P conveyed from the accommodating unit 103. The recording material P having the toner images transferred thereon is conveyed from the image forming unit 110 to the fixing device 200.

The fixing device 200 includes a fixing roller 201 (fixing member), a pressing roller 202 (pressing member), and a cleaning unit 210. The fixing device 200 fixes the toner images that have been transferred onto the recording material P, onto the recording material P by applying heat and pressure to the recording material P. As described later, the cleaning unit 210 is configured so as to clean the fixing roller 201 by removing unfixed toner adhering onto the fixing roller 201.

In the case of one-sided printing, the image forming apparatus 100 discharges the recording material P having been processed by the image forming unit 110 and the fixing device 200 to the outside of the apparatus by guiding the recording material P to a discharge path 139 using a flapper 132. The flapper 132 operates so as to selectively guide the recording material P having passed through the fixing device 200 to a conveyance path 134 or the discharge path 139.

On the other hand, in the case of both-sided printing, the image forming apparatus 100 conveys the recording material P already having an image formed on the first side thereof to the image forming unit 110 again so that an image is formed on the second side thereof. Specifically, the image forming apparatus 100 guides the recording material P having passed through the fixing device 200 to the conveyance path 134 using the flapper 132, and conveys the recording material P to a reversal unit 136. Once the rear end of the recording material P is detected by a reversal sensor 135, the image forming apparatus 100 reverses the conveyance direction of the recording material P using the reversal unit 136, and guides the recording material P to a conveyance path 137 using a flapper 135. The image forming apparatus 100 further conveys the recording material P to the image forming unit 110 (the transfer position, where transferring is performed by the transfer roller 116) through the conveyance path 137, and further conveys the recording material P having toner images transferred onto the second side thereof to the fixing device 200. The forming of images on both sides (the first and second sides) of the recording material P is completed by fixing processing being performed by the fixing device 200. The image forming apparatus 100 discharges the recording material P having passed through the fixing device 200 to the outside of the apparatus by guiding the recording material P to the discharge path 139 using the flapper 132.

The image forming apparatus 100 further includes a control board 150 and an operation unit 180. The operation unit 180 includes a display unit that can display various types of screens, and an operation input unit that includes operation keys that can be operated by a user. The display unit is used to, for example, display the state of the image forming apparatus 100, and to display an operation screen. The operation input unit is used to receive instructions from the user. Note that the operation input unit may include a touch panel disposed on the display unit.

The control board 150 includes a CPU 151 and a memory 152. The CPU 151 functions as a controller that controls the operation of the entire image forming apparatus 100 by controlling the devices inside the image forming apparatus 100. The CPU 151 controls the devices inside the image forming apparatus 100 based on signals output from sensors inside the image forming apparatus 100 and information (data) stored in the memory 152. Data necessary for controlling the devices are stored in the memory 152, and the data can be used by the CPU 151.

<Configuration of Fixing Device 200>

Figure 22:
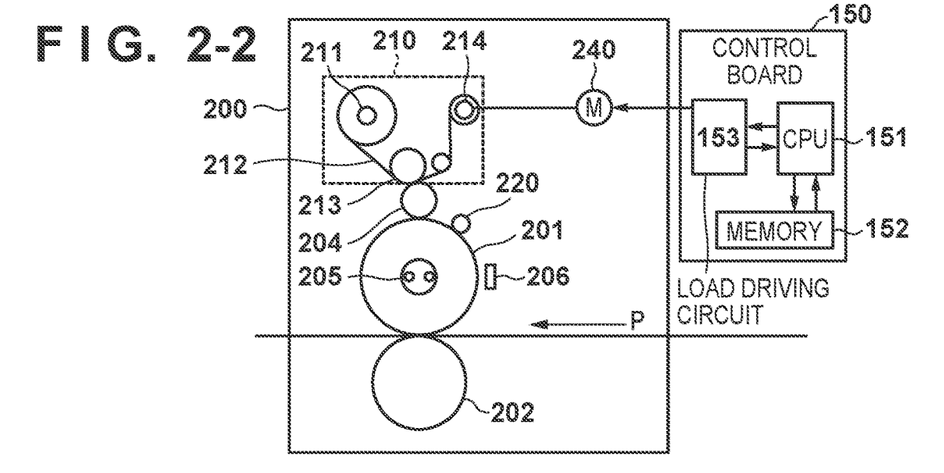

FIGS. 2-1A, 2-1B, and 2-2 are diagrams illustrating an example configuration of the fixing device 200 in the present embodiment. FIG. 2-1A illustrates an example of the state of the fixing device 200 in a cleaning state in which the fixing roller 201 is cleaned by the cleaning unit 210. FIG. 2-1B illustrates an example of the state of the fixing device 200 in a standby state. FIG. 2-2 illustrates an example of the state of the fixing device 200 in a refreshing state in which a refreshing operation is performed on the fixing roller 201 by a refreshing roller 220.

Figure 3:
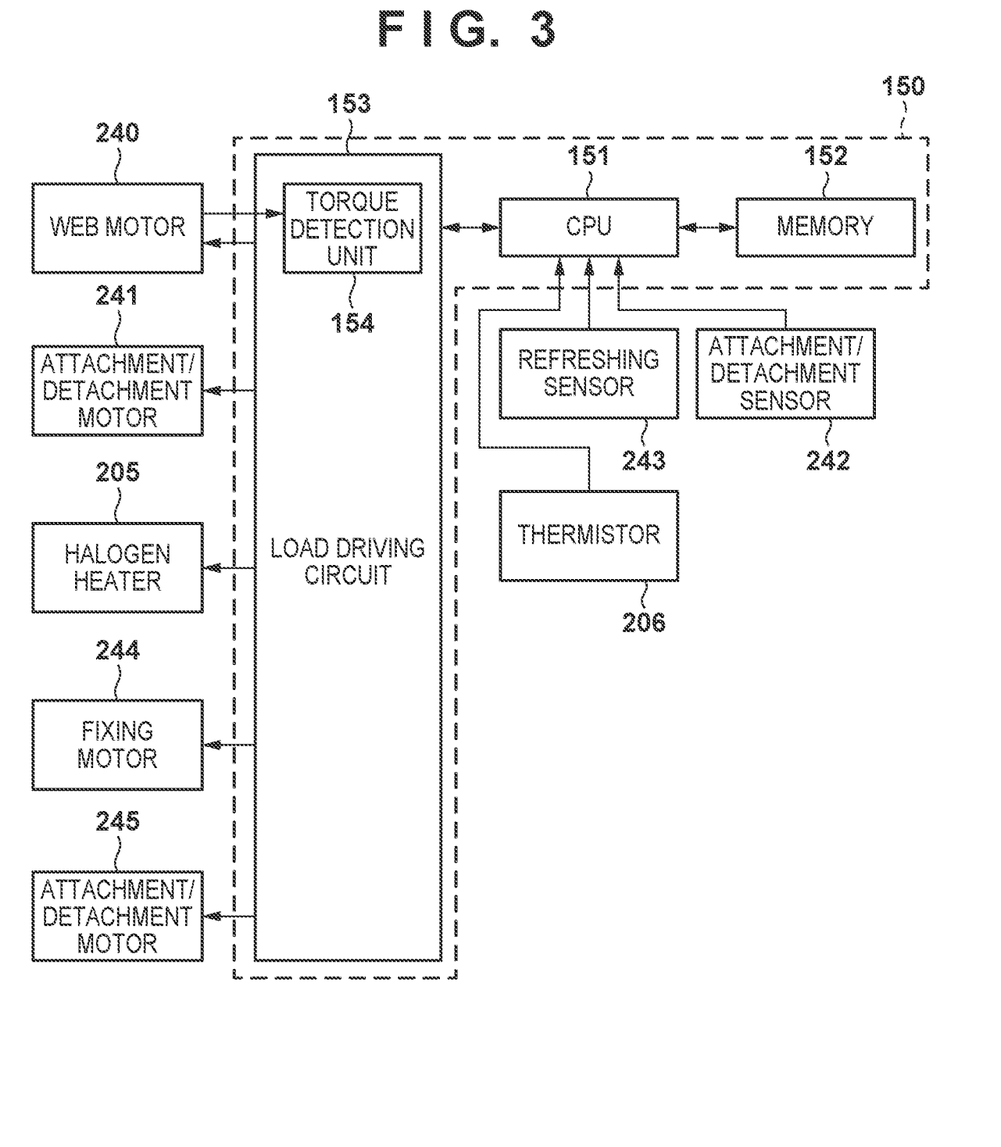
FIG. 3 is a block diagram illustrating an example control configuration relating to control of the fixing device.

Furthermore, FIG. 3 is a block diagram illustrating an example control configuration relating to control of the fixing device 200. The control board 150 includes the CPU 151, the memory 152, and a load driving circuit 153. The CPU 151 controls the load driving circuit 153 and controls the operation of electric components (various types of motors, various types of sensors, a halogen heater 205, a thermistor 206, etc.) inside the fixing device 200.

The load driving circuit 153 is configured so as to drive a web motor 240, an attachment/detachment motor 241, the halogen heater 205, a fixing motor 244, and an attachment/detachment motor 245 by being controlled by the CPU 151. Furthermore, the load driving circuit 153 includes a torque detection unit 154 that detects the torque of the web motor 240. The attachment/detachment motor 241 drives an attachment/detachment mechanism (not illustrated) that attaches and detaches the cleaning unit 210, a recovery roller 204, and the fixing roller 201 to and from one another. The recovery roller 204 can be switched by this attachment/detachment mechanism between a contact state in which the recovery roller 204 is in contact with a web 212 and a non-contact state in which the recovery roller 204 is separated from the web 212. The attachment/detachment motor 245 drives an attachment/detachment mechanism (not illustrated) that attaches and detaches the refreshing roller 220 to and from the fixing roller 201. The refreshing roller 220 can be switched by this attachment/detachment mechanism between a contact state in which the refreshing roller 220 is in contact with the fixing roller 201 and a non-contact state in which the refreshing roller 220 is separated from the fixing roller 201. In the present embodiment, the load driving circuit 153 is one example of a driving unit that includes a detection unit (torque detection unit 154) and that is configured to drive a motor, the detection unit being configured to detect the torque of the motor. Furthermore, the CPU 151 is one example of a controller configured to control the driving unit (load driving circuit 153).

As illustrated in FIGS. 2-1A, 2-1B, and 2-2, the fixing device 200 includes the fixing roller 201 (fixing member), the pressing roller 202 (pressing member), the recovery roller 204, the thermistor 206, the cleaning unit 210, the refreshing roller 220, and the web motor 240. The fixing processing for fixing the toner images on the recording material P is performed in a nip portion that is formed between the fixing roller 201 (fixing member) and the pressing roller 202 (pressing member).

The fixing roller 201 is formed from a hollow roller, and includes the halogen heater 205 as a heat source inside the hollow roller. The thermistor 206 is a sensor for measuring the temperature of the fixing roller 201. The CPU 151 maintains or adjusts the temperature of the fixing roller 201 at or to a predetermined temperature by controlling the on and off of the halogen heater 205 based on the temperature measured by the thermistor 206.

The fixing roller 201 is configured so as to rotate by being driven (driven to rotate) by the fixing motor 244, and the pressing roller 202 is configured so as to passively rotate as the fixing roller 201 rotates. The fixing roller 201 and the pressing roller 202 convey the recording material P downstream in the conveyance direction (in the direction of the arrow in FIGS. 2-1A, 2-1B, and 2-2) while applying heat and pressure to the recording material P in the nip portion therebetween.

The recovery roller 204 is configured so as to passively rotate as the fixing roller 201 rotates in a state in which the recovery roller 204 is in contact with the fixing roller 201 (FIG. 2-1A), and recover toner (unfixed toner) adhering onto the fixing roller 201 (fixing member). For example, the recovery roller 204 is formed from a roller made of stainless steel. The cleaning unit 210 is configured so as to clean the fixing roller 201 by removing, via the recovery roller 204, objects adhering onto the fixing roller 201.

The cleaning unit 210 includes a supplying roller 211, the cleaning web 212 (hereinafter simply "web"), a pressing roller 213, and a winding roller 214. The winding roller 214 rotates by being driven by the web motor 240, and the supplying roller 211 passively rotates as the winding roller 214 rotates. Thus, the web motor 240 is one example of a motor that is configured to drive a second roller (winding roller 214).

The web 212 is a sheet-shaped (belt-shaped) cleaning member that is formed from a non-woven fabric or the like, and cleans the recovery roller 204. The web 212 is wound around the supplying roller 211 in advance in an unused state. The web 212 is arranged such that an unused portion thereof is fed (supplied) as the supplying roller 211 rotates, and so as to be wound by the winding roller 214 after passing over the pressing roller 213, which is arranged facing the recovery roller 204.

The pressing roller 213 is configured so as to press the web 212 against the recovery roller 204 within a region of a predetermined width in a width direction that is orthogonal to the direction of rotation thereof. By the winding roller 214 being driven so as to intermittently wind the web 212 supplied from the supplying roller 211 in a state in which the web 212 is pressed against the recovery roller 204 (FIG. 2-1A), the web 212 is rubbed against the recovery roller 204. Thus, toner on the recovery roller 204 is consequently wiped off by the unused portion of the web 212 (the portion supplied from the supplying roller 211).

Thus, in the present embodiment, the supplying roller 211 is one example of a first roller that has a cleaning web wound therearound in advance, and the winding roller 214 is one example of a second roller that winds the cleaning web supplied from the first roller (supplying roller 211). Furthermore, the pressing roller 213 is one example of a third roller that is arranged facing the recovery roller 204 and that presses the cleaning web against the recovery roller 204 to clean the recovery roller 204, the cleaning web being fed from the first roller (supplying roller 211) toward the second roller (winding roller 214) as the second roller rotates.

The refreshing roller 220 is formed from a polishing roller having a rough surface. The refreshing roller 220 is used in a refreshing operation for removing scratches or adhering objects that may be generated on the fixing roller 201 when a print job in which image forming is continuously performed on a large quantity of recording materials P is executed, for example. During the refreshing operation, the refreshing roller 220 is placed in a state in which the refreshing roller 220 contacts (presses) the fixing roller 201 (FIG. 2-2), and passively rotates as the fixing roller 201 rotates.

<Operational State of Fixing Device 200>

In the present embodiment, the operational state of the fixing device 200 transitions among the cleaning state (FIG. 2-1A), the standby state (FIG. 2-1B), and the refreshing state (FIG. 2-2).

In the cleaning state (FIG. 2-1A), the cleaning unit 210 and the recovery roller 204 are in a contact state in which the cleaning unit 210 and the recovery roller 204 are in contact with one another (a pressing state in which the cleaning unit 210 and the recovery roller 204 press one another). Furthermore, the recovery roller 204 and the fixing roller 201 are in a contact state in which the recovery roller 204 and the fixing roller 201 are in contact with one another (a pressing state in which the recovery roller 204 and the fixing roller 201 press one another). In the standby state (FIG. 2-1B), the cleaning unit 210, the recovery roller 204, and the fixing roller 201 are in a non-contact state in which the cleaning unit 210, the recovery roller 204, and the fixing roller 201 are separated from one another (non-pressing state in which the cleaning unit 210, the recovery roller 204, and the fixing roller 201 do not press one another). The switching of the cleaning unit 210, the recovery roller 204, and the fixing roller 201 between the contact state and the non-contact state (attachment and detachment thereof) is performed using the attachment/detachment motor 241 and an attachment/detachment sensor 242. The attachment/detachment sensor 242 is configured so as to output an ON signal if the recovery roller 204 is in contact with the fixing roller 201, and to output an OFF signal if the recovery roller 204 is not in contact with the fixing roller 201.

In the cleaning state and the standby state, the refreshing roller 220 is in a non-contact state in which the refreshing roller 220 is separated from the fixing roller 201. In the refreshing state (FIG. 2-2), the refreshing roller 220 is in a contact state in which the refreshing roller 220 is in contact with the fixing roller 201. The switching of the refreshing roller 220 between the contact state and the non-contact state (attachment and detachment thereof) is performed using the attachment/detachment motor 245 and a refreshing sensor 243. The refreshing sensor 243 is configured so as to output an ON signal if the refreshing roller 220 is in contact with the fixing roller 201, and to output an OFF signal if the refreshing roller 220 is not in contact with the fixing roller 201.

Upon performing the cleaning operation by means of the cleaning unit 210, the CPU 151 causes the attachment/detachment motor 241 to operate until the output from the attachment/detachment sensor 242 switches from the OFF signal to the ON signal. Thus, the cleaning unit 210, the recovery roller 204, and the fixing roller 201 are placed in the contact state (pressing state).

Upon changing the operational state of the fixing device 200 from the cleaning state to the standby state, the CPU 151 causes the attachment/detachment motor 241 to operate until the output from the attachment/detachment sensor 242 switches from the ON signal to the OFF signal. Thus, the cleaning unit 210, the recovery roller 204, and the fixing roller 201 are placed in the non-contact state (non-pressing state). Upon executing a print job (image forming), the CPU 151 causes the fixing motor 244 to operate so as to cause the fixing roller 201 to rotate in this non-pressing state. In addition, based on the temperature of the fixing roller 201 measured by the thermistor 206, the CPU 151 controls the halogen heater 205 so that the temperature of the fixing roller 201 is kept within a predetermined range.

Furthermore, upon performing the refreshing operation using the refreshing roller 220, the CPU 151 causes the attachment/detachment motor 245 to operate until the output from the refreshing sensor 243 switches from the OFF signal to the ON signal. Thus, the refreshing roller 220 is placed in the contact state (pressing state) in which the refreshing roller 220 is in contact with the fixing roller 201. The CPU 151 removes scratches or adhering objects present on the surface of the fixing roller 201 using the refreshing roller 220 by causing the fixing motor 244 to operate so as to cause the fixing roller 201 to rotate in this pressing state.

<Configuration of Load Driving Circuit 153>

In the present embodiment, during the execution of the cleaning operation, the torque (load torque) of the web motor 240 is detected using the torque detection unit 154 provided in the load driving circuit 153, and the operation of the web motor 240 is stopped based on the detection result. For example, the operation of the web motor 240 is stopped if a torque detection value of the web motor 240 exceeds a predetermined threshold. Thus, a situation is prevented in which tearing of the web 212 occurs by the web 212 and the recovery roller 204 pulling one another due to an increase in the force of friction between the web 212 and the recovery roller 204.

Figure 41:
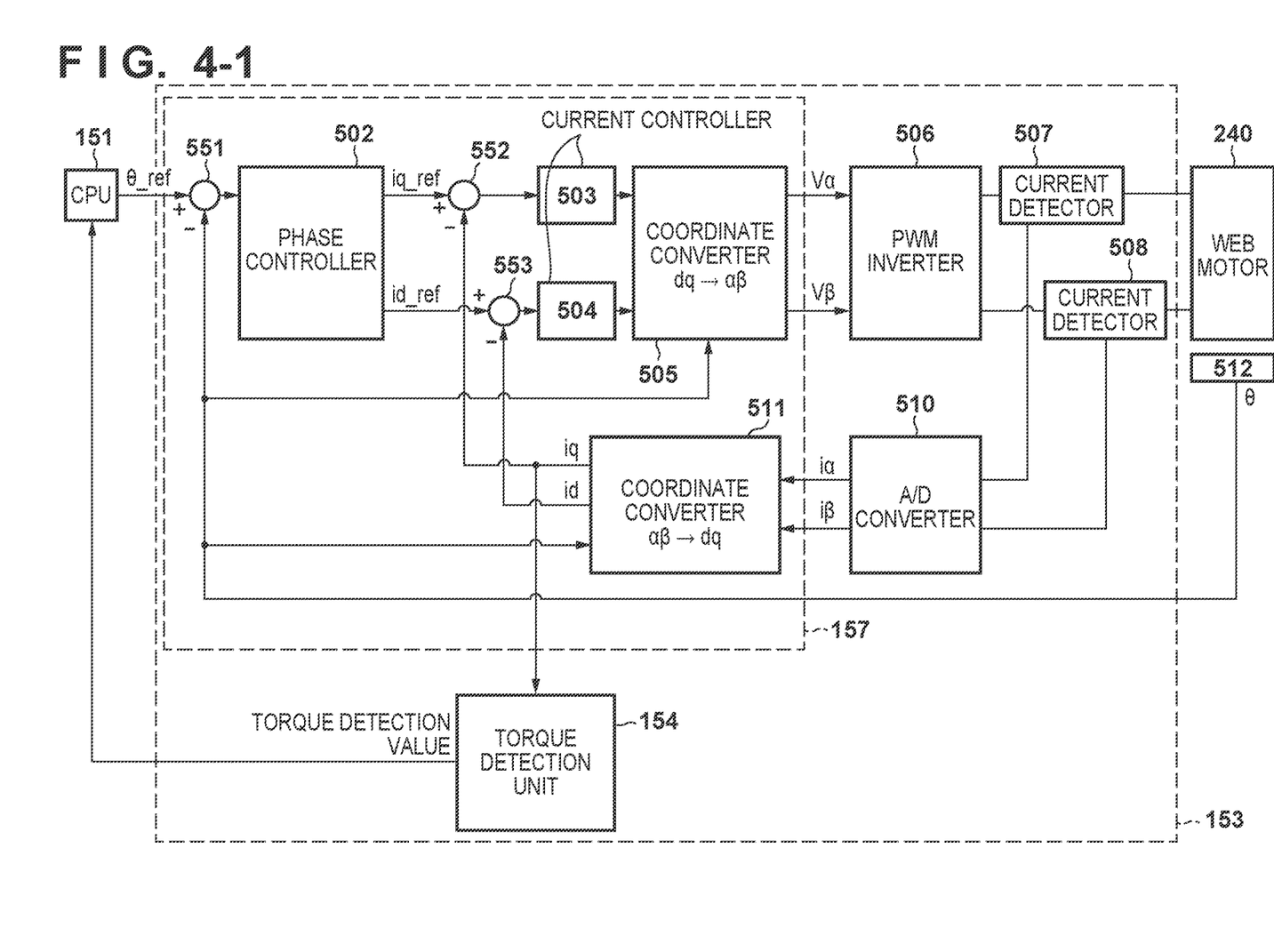
Figure 42:
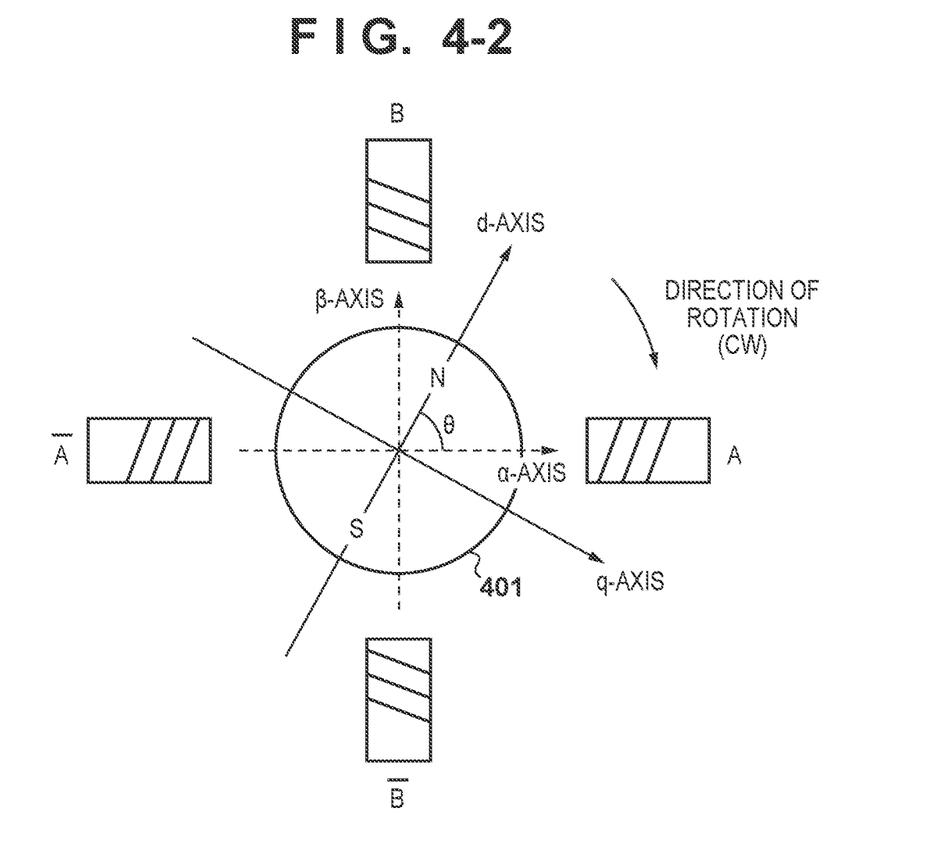

An example configuration of the load driving circuit 153 will be described with reference to FIGS. 4-1 and 4-2. While a driving configuration for the web motor 240 will be described in the following, a similar driving configuration may also be used for other motors (the attachment/detachment motors 241 and 245, and the fixing motor 244). In the present embodiment, a configuration is adopted in which a stepping motor having two phases, namely an A phase (first phase) and a B phase (second phase), is used as the web motor 240, and vector control is used to control the driving of the motor. As described in the following, a rotating-coordinate-system current value (q-axis-current current value) that is obtained in this configuration is used in the detection of the torque of the web motor 240 by the torque detection unit 154.

FIG. 4-1 is a block diagram illustrating an example configuration of the load driving circuit 153. In the web motor 240, a phase detection unit 512 for detecting the rotational phase $\theta$ of a rotor 401 of the motor is provided. For example, the phase detection unit 512 can be formed using a rotary encoder. The rotational phase $\theta$ may be estimated based on estimated values of induced voltages (counter-electromotive voltages) $E\alpha$ and $E\beta$ that are induced in the A-phase and B-phase windings of the web motor 240 by the rotation of the rotor 401. That is, sensorless control may be applied to control the driving of the web motor 240. Furthermore, the motor is controlled based on the rotational phase $\theta$, a command phase $\theta\_ref$, etc., that are electric angles in the following description. However, electric angles may be converted into mechanical angles, and the motor may be controlled based on such mechanical angles, for example.

FIG. 4-2 illustrates the relationship between the motor and a rotating coordinate system represented by a d axis and a q axis. In FIG. 4-2, an $\alpha$ axis that is an axis corresponding to the A-phase winding and a $\beta$ axis that is an axis corresponding to the B-phase winding are defined in a stationary coordinate system. Furthermore, the d axis is defined along the direction of the magnetic flux produced by the magnetic poles of a permanent magnet used in the rotor 401, and the q axis is defined along a direction that is 90° forward in the counterclockwise direction from the d axis (direction that is orthogonal to the d axis). The angle formed by the $\alpha$ axis and the d axis is defined as $\theta$, and the rotational phase of the rotor 401 is represented by the angle $\theta$.

In the vector control, a rotating coordinate system in which the rotational phase $\theta$ of the rotor 401 is set as a reference is used. Specifically, the values of current components, in the rotating coordinate system, of a current vector corresponding to the driving currents flowing through the windings of the motor (web motor 240) are used. The current vector in the rotating coordinate system includes a q-axis component (torque current component) that generates torque in the rotor 401 and a d-axis component (excitation current component) that affects the intensity of the magnetic flux penetrating the windings. The values of the d-axis and q-axis components of this current vector are used in the vector control.

The vector control is a control scheme for controlling the motor by performing phase feedback control in which the value of the torque current component iq and the value of the excitation current component id are controlled so that the deviation between a command phase indicating the target phase of the rotor 401 and the actual rotational phase is reduced. Also, there is a control scheme for controlling the motor by performing speed feedback control in which the value of the torque current component iq and the value of the excitation current component id are controlled so that the deviation between a command speed indicating the target speed of the rotor 401 and the actual rotational speed is reduced.

As illustrated in FIG. 4-1, the load driving circuit 153 includes a motor control unit 157, a PWM inverter 506, current detectors 507 and 508, an A/D converter 510, and the torque detection unit 154. The motor control unit 157 receives from the CPU 151, which is a higher-level controller, input of a control signal indicating the command phase θ_ref, which indicates the target phase of the rotor 401 of the web motor 240. The motor control unit 157 is formed from at least one ASIC, and executes the functions described in the following.

The PWM inverter 506 drives the web motor 240 by supplying driving currents to the windings of the web motor 240 in accordance with a PWM signal based on driving voltages Vα and Vβ output from the motor control unit 157. The motor control unit 157 performs the above-described vector control, in which the driving currents supplied to the web motor 240 are controlled using current values in a rotating coordinate system in which the rotational phase θ of the rotor 401 of the web motor 240 is set as a reference.

In the vector control, the current vector corresponding to the driving currents flowing through the A-phase and B-phase windings of the web motor 240 is converted from the stationary coordinate system represented by the α and β axes into the rotating coordinate system represented by the d and q axes. As a result of such a conversion, the driving currents supplied to the web motor 240 are represented by a d-axis component (d-axis current) and a q-axis component (q-axis current) of a direct current in the rotating coordinate system. In this case, the q-axis current corresponds to a torque current component that generates torque in the web motor 240, and is a current that contributes to the rotation of the rotor 401. The d-axis current corresponds to an excitation current component that affects the intensity of the magnetic flux of the rotor 401 of the web motor 240.

The motor control unit 157 can control the q-axis component (q-axis current) and the d-axis component (d-axis current) of the current vector independently of one another. Thus, torque necessary for the rotor 401 to rotate can be generated efficiently.

The motor control unit 157 performs the vector control based on the rotational phase θ detected by the phase detection unit 512. In the outer control loop including a phase controller 502, the phase of the web motor 240 is controlled based on a determination result of the rotational phase θ of the rotor 401 of the web motor 240.

The CPU 151 generates a command phase θ_ref indicating the target phase of the rotor 401 of the web motor 240, and outputs the command phase θ_ref to the motor control unit 157 at a predetermined time cycle. For example, the command phase θ_ref is a pulsed rectangular wave signal, one pulse of which corresponds to the minimum change amount of the rotation angle of the web motor 240 (stepping motor). A subtractor 551 calculates the deviation between the command phase θ_ref and the rotational phase θ of the rotor 401 of the web motor 240, and outputs the deviation to the phase controller 502.

The phase controller 502 generates and outputs a q-axis-current command value iq_ref and a d-axis-current command value id_ref based on PID control (proportional control (P), integral control (I), and derivative control (D)) for example, so that the deviation output from the subtractor 551 is reduced. Specifically, the phase controller 502 generates and outputs the q-axis-current command value iq_ref and the d-axis-current command value id_ref based on PID control so that the deviation output from the subtractor 551 becomes zero. Note that, in the phase controller 502, PI control may be used in place of PID control, for example. Furthermore, if a permanent magnet is used in the rotor 401, the d-axis-current command value id_ref affecting the intensity of the magnetic flux penetrating the windings is usually set to zero. However, there is no limitation to this.

In the control loop including current controllers 503 and 504, the driving currents flowing through the windings of the respective phases of the web motor 240 are controlled based on detected values of the driving currents flowing through the windings of the respective phases of the web motor 240. Here, the driving currents (alternating currents) flowing through the A-phase and B-phase windings of the web motor 240 are respectively detected by current detectors 507 and 508, and are then converted from analog values into digital values by the A/D converter 510. The driving-current current values converted from analog values into digital values by the A/D converter 510 can be expressed as in the following expressions as current values iα and iβ in the stationary coordinate system. Note that I indicates the magnitude of current amplitude.

$$i\alpha = I^* \cos \theta$$

$$i\beta = I^* \sin \theta \quad (1)$$

These current values iα and iβ are input to a coordinate converter 511.

The coordinate converter 511 converts the current values iα and iβ in the stationary coordinate system into a q-axis-current current value iq and a d-axis-current current value id in the rotating coordinate system using the following expressions.

$$id = \cos \theta^* i\alpha + \sin \theta^* i\beta$$

$$iq = -\sin \theta^* i\alpha + \cos \theta^* i\beta \quad (2)$$

The q-axis-current command value iq_ref output from the phase controller 502 and the current value iq output from the coordinate converter 511 are input to a subtractor 552. The subtractor 552 calculates the deviation between the q-axis-current command value iq_ref and the current value iq, and outputs the deviation to the current controller 503. Also, the d-axis-current command value id_ref output from the phase controller 502 and the current value id output from the coordinate converter 511 are input to a subtractor 553. The subtractor 553 calculates the deviation between the d-axis-current command value id_ref and the current value id, and outputs the deviation to the current controller 504.

The current controller 503 generates a driving voltage Vq based on PID control so that the deviation input thereto is reduced. Specifically, the current controller 503 generates the driving voltage Vq so that the deviation input thereto becomes zero, and outputs the driving voltage Vq to a coordinate converter 505. Also, the current controller 504 generates a driving voltage Vd based on PID control so that the deviation input thereto is reduced. Specifically, the current controller 504 generates the driving voltage Vd so that the deviation input thereto becomes zero, and outputs the driving voltage Vd to the coordinate converter 505. Note that, in the current controller 503, PI control may be used in place of PID control, for example.

The coordinate converter 505 inversely converts the driving voltages Vq and Vd in the rotating coordinate system output from the current controllers 503 and 504 into driving voltages Vα and Vβ in the stationary coordinate system using the following expressions.

$$V\alpha = \cos \theta^* Vd - \sin \theta^* Vq$$

$$V\beta = \sin \theta^* Vd + \cos \theta^* Vq \quad (3)$$

The coordinate converter 505 outputs the driving voltages Vα and Vβ obtained by the conversion to the PWM inverter 506. A full-bridge circuit included in the PWM inverter 506 is driven by pulse-width-modulation (PWM) signals based on the driving voltages Vα and Vβ input from the coordinate converter 505. Accordingly, the PWM inverter 506 drives the web motor 240 by generating driving currents iα and iβ corresponding to the driving voltages Vα and Vβ, and supplying the driving currents iα and iβ to the windings of the respective phases of the web motor 240. Note that the PWM inverter 506 may include a half-bridge circuit or the like.

In the present embodiment, the q-axis-current current value iq output from the coordinate converter 511 is input not only to the subtractor 552 but also to the torque detection unit 154. The q-axis-current current value iq changes in accordance with the torque generated in the web motor 240, and this torque is proportional to load torque. In other words, the current value iq changes in accordance with the load torque of the web motor 240. Thus, the load torque of the web motor 240 can be detected by detecting the current value iq. The torque detection unit 154 detects the torque (load torque) of the web motor 240 based on the q-axis-current current value iq input thereto, and outputs a torque detection value. Note that the torque detection value output from the torque detection unit 154 may be the q-axis-current current value iq itself.

As described above, the q-axis-current current value iq changes in accordance with the torque (load torque) of the web motor 240, and this load torque changes in accordance with the force of friction between the web 212 and the recovery roller 204. Thus, in the present embodiment, the CPU 151 acquires the torque detection value of the web motor 240 based on the q-axis-current current value iq, and detects the occurrence of pulling between the web 212 and the recovery roller 204 using the torque detection value. Specifically, the CPU 151 determines that the force of friction between the web 212 and the recovery roller 204 has increased and pulling has occurred when the torque detection value exceeds a predetermined value (threshold). In this case, the CPU 151 stops the operation (driving) of the web motor 240 in order to prevent tearing of the web 212 from occurring.

<Processing Procedure>

Figure 5:
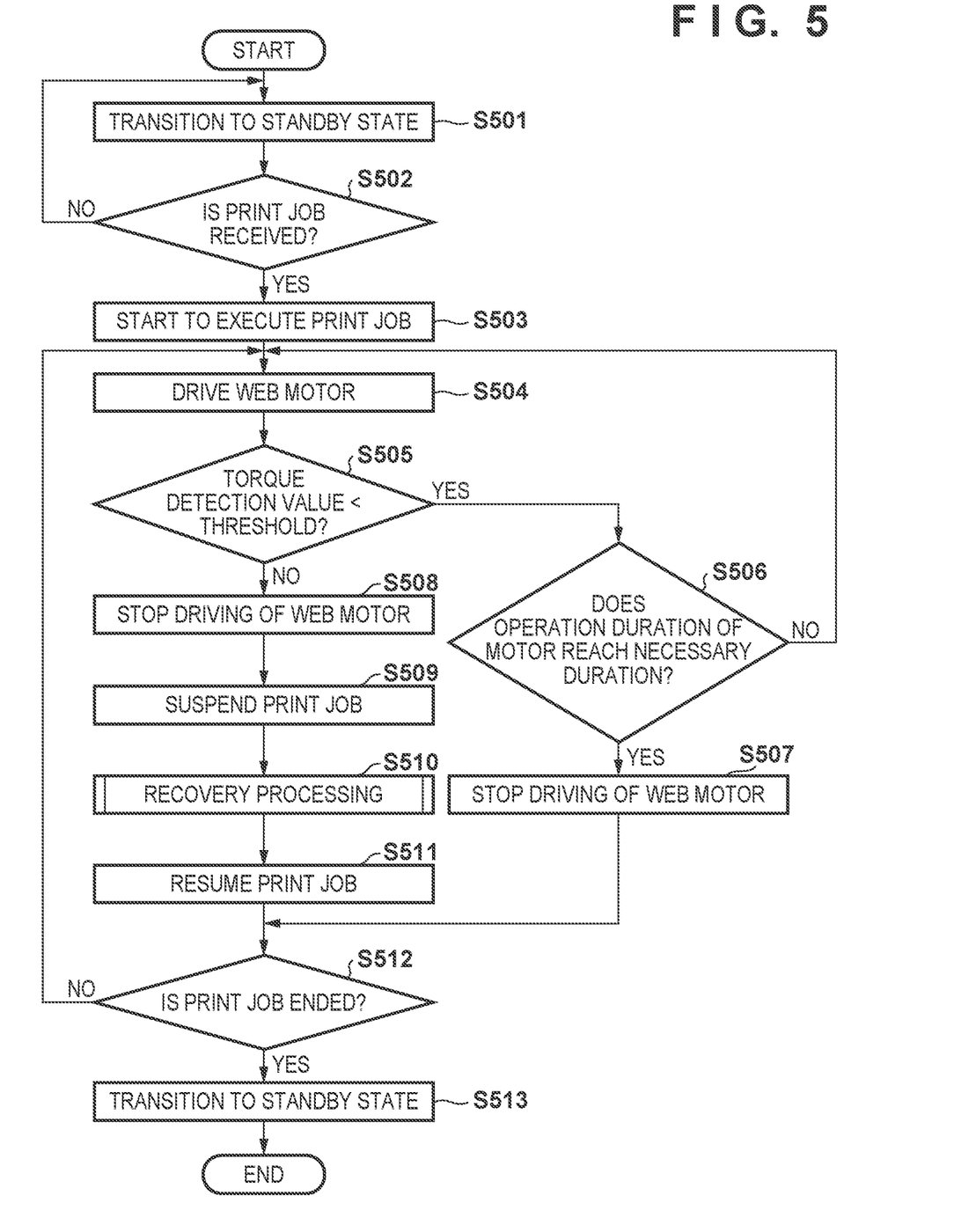
FIG. 5 is a flowchart illustrating an execution procedure of a print job in the image forming apparatus.

FIG. 5 is a flowchart illustrating an execution procedure of a print job in the image forming apparatus 100 according to the present embodiment. The processing in each step in FIG. 5 may be realized in the image forming apparatus 100 by the CPU 151 reading and executing one or more control programs stored in the memory 152.

Upon starting processing according to the present procedure, in step S501, the CPU 151 causes the image forming apparatus 100 to transition to the standby state. In the fixing device 200 which is in the standby state, the cleaning unit 210, the recovery roller 204, and the fixing roller 201 are in the non-contact state, as illustrated in FIG. 2-1B. After the transition to the standby state, the CPU 151 waits until a print job is received in step S502, and advances processing to step S503 when a print job is received. In step S503, the CPU 151 starts to execute the print job by controlling the operation of the devices inside the image forming apparatus 100. Upon starting the execution of the print job, the CPU 151 places the fixing device 200 in the cleaning state illustrated in FIG. 2-1A.

Next, in step S504, the CPU 151 causes the load driving circuit 153 to drive the web motor 240 in the fixing device 200 which is in the cleaning state. After the driving of the web motor 240 is started, in step S505, the CPU 151 determines whether or not the torque detection value output from the torque detection unit 154 (of the load driving circuit 153), which indicates the torque (load torque) of the web motor 240, is below the threshold. The CPU 151 advances processing to step S506 if the torque detection value is below the threshold, and advances processing to step S508 if the torque detection value is greater than or equal to the threshold.

In step S506, the CPU 151 determines whether or not the operation duration of the web motor 240 has reached a duration (necessary duration) corresponding to the necessary winding amount of the web 212. If the operation duration of the web motor 240 has not reached the necessary duration, the CPU 151 returns processing to step S504 and continues to drive the web motor 240. On the other hand, if the operation duration of the web motor 240 has reached the necessary duration, the CPU 151 advances processing to step S507 and stops the driving of the web motor 240. Thus, a winding operation in which the web 212 is wound by the winding roller 214 driven by the web motor 240 terminates normally.

If the torque detection value of the web motor 240 is greater than or equal to the threshold, the web 212 and the recovery roller 204 have started pulling one another, which may lead to tearing of the web 212. In this case, the CPU 151 stops the driving of the web motor 240 in step S508, and suspends the execution of the print job in step S509. Subsequently, in step S510, the CPU 151 performs recovery processing in accordance with the later-described procedure in FIG. 6. The recovery processing is processing for cancelling a state in which the torque (the force of friction between the web 212 and the recovery roller 204) of the web motor 240 is high, and also removing toner adhering onto the recovery roller 204 and the fixing roller 201.

Once the recovery processing in step S510 is completed and the state in which the torque of the web motor 240 is high is cancelled, the CPU 151 resumes the execution of the print job in step S511. Subsequently, in step S512, the CPU 151 determines whether or not to terminate the execution of the print job. The CPU 151 returns processing to step S504 if the execution of the print job is not to be terminated, and repeats the above-described processing (steps S504 to S511) until the execution of the print job is terminated. If the execution of the print job is to be terminated, the CPU 151 causes the image forming apparatus 100 to transition to the standby state in step S513, and terminates the processing.

<Recovery Processing>

Figure 6:
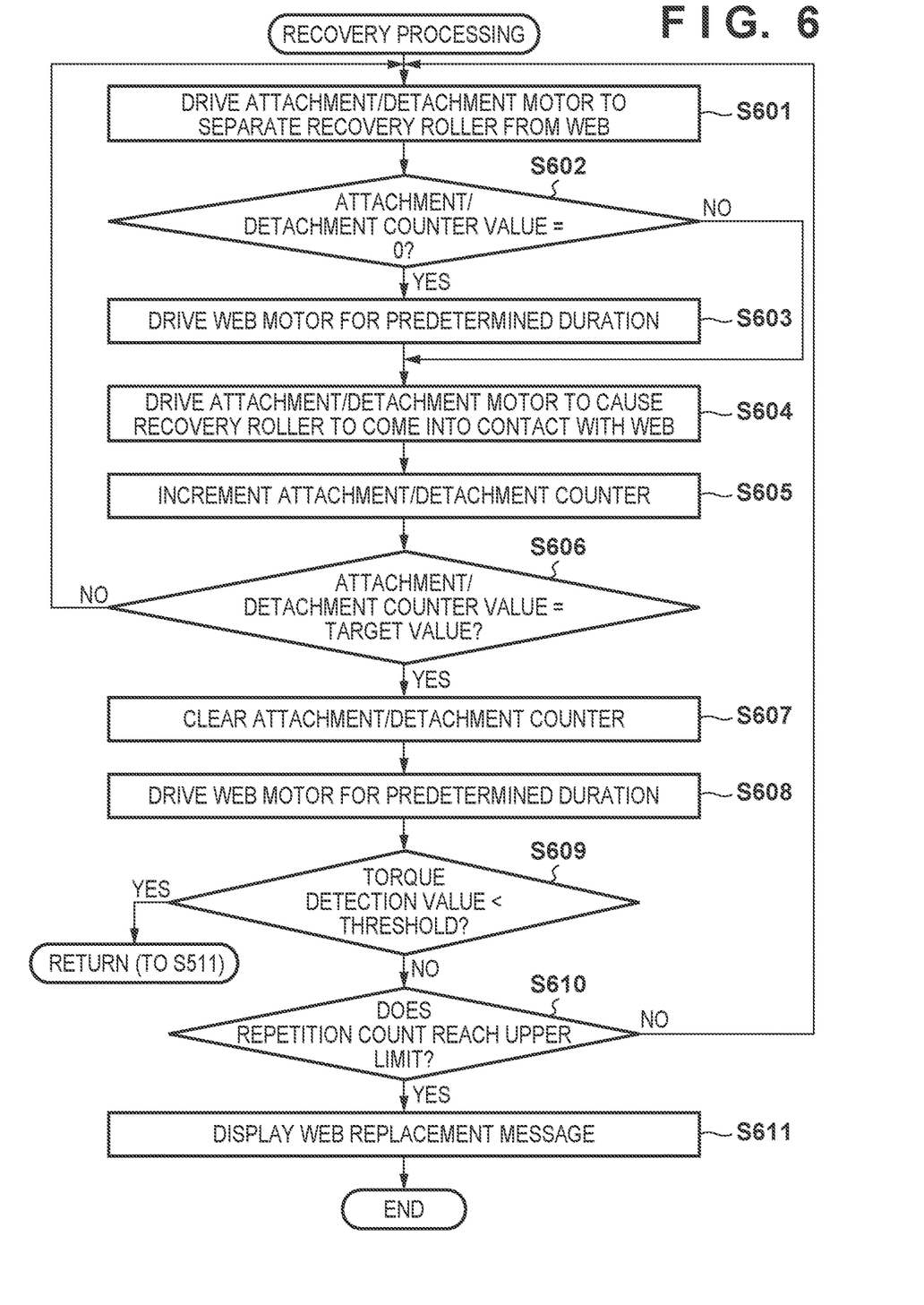
FIG. 6 is a flowchart illustrating a procedure of recovery processing (S510) (first embodiment).

FIG. 6 is a flowchart illustrating a procedure of the recovery processing in step S510. First, in step S601, the CPU 151 causes using the load driving circuit 153 to drive the attachment/detachment motor 241 in the direction in which the recovery roller 204 is separated from the web 212. By driving the attachment/detachment motor 241 until the output from the attachment/detachment sensor 242 switches from the ON signal to the OFF signal, the CPU 151 places the recovery roller 204 in the non-contact state (non-pressing state) from the contact state (pressing state). Once the output from the attachment/detachment sensor 242 switches to the OFF signal, the CPU 151 stops the driving of the attachment/detachment motor 241.

Next, in step S602, the CPU 151 determines whether or not the value of an attachment/detachment counter stored in the memory 152 is "0". The attachment/detachment counter is used to manage the execution count of the attachment/detachment operation (steps S601 to S604) of the cleaning unit 210, the recovery roller 204, and the fixing roller 201 performed by the attachment/detachment motor 241 in the recovery processing according to the procedure in FIG. 6. The attachment/detachment counter value "0" indicates that the present attachment/detachment operation in steps S601 to S604 is the first iteration thereof. The CPU 151 advances processing to step S603 if the attachment/detachment counter value is "0", and advances processing to step S604 if the attachment/detachment counter value is not "0".

In step S603, the CPU 151 causes the load driving circuit 153 to drive the web motor 240 for a predetermined duration. By the winding operation of the web 212 being performed in such a manner by the winding roller 214, which is driven by the web motor 240, the state in which the torque (the force of friction between the web 212 and the recovery roller 204) of the web motor 240 is high may be cancelled. Subsequently, the CPU 151 advances processing to step S604.

In step S604, the CPU 151 causes the load driving circuit 153 to drive the attachment/detachment motor 241 in the direction in which the recovery roller 204 comes in contact with the web 212. By driving the attachment/detachment motor 241 until the output from the attachment/detachment sensor 242 switches from the OFF signal to the ON signal, the CPU 151 places the recovery roller 204 in the contact state (pressing state) from the non-contact state (non-pressing state). Once the output from the attachment/detachment sensor 242 switches to the ON signal, the CPU 151 stops the driving of the attachment/detachment motor 241.

Once the attachment/detachment operation (steps S601 to S604) of the cleaning unit 210, the recovery roller 204, and the fixing roller 201 performed by the attachment/detachment motor 241 is completed in such a manner, the CPU 151 increments the attachment/detachment counter in step S605. Furthermore, in step S606, the CPU 151 determines whether or not the attachment/detachment counter value has reached a target value. The CPU 151 returns processing to step S601 If the attachment/detachment counter value has not reached the target value. Thus, the processing in steps S601 to S604 is repeated until the attachment/detachment counter value reaches the target value (in other words, until a predetermined number of iterations of the attachment/detachment operation of the cleaning unit 210, the recovery roller 204, and the fixing roller 201 has been executed). The CPU 151 advances processing to step S607 once the attachment/detachment counter value reaches the target value.

In step S607, the CPU 151 clears the attachment/detachment counter (resets the attachment/detachment counter to "0"), and advances to step S608. In step S608, while the recovery roller 204 is in the contact state with respect to the web 212, the CPU 151 causes the load driving circuit 153 to drive the web motor 240 for a predetermined amount of time. Thus, toner adhering onto the recovery roller 204 is removed using the web 212.

Subsequently, in step S609, the CPU 151 determines whether or not the torque detection value, which is output from the torque detection unit 154 while the web motor 240 is being driven and which indicates the torque (load torque) of the web motor 240, is below the threshold. Thus, the CPU 151 checks whether the state in which the torque (the force of friction between the web 212 and the recovery roller 204) of the web motor 240 is high has been cancelled. The CPU 151 terminates the processing according to the procedure in FIG. 6 and advances processing to step S511 if the torque detection value is below the threshold, and advances processing to step S610 if the torque detection value is greater than or equal to the threshold.

In step S610, the CPU 151 determines whether or not the execution count (repetition count) of the processing in steps S601 to S608 has reached a predetermined upper limit. In the present embodiment, the processing in steps S601 to S608 is repeatedly executed until the state in which the torque (the force of friction between the web 212 and the recovery roller 204) of the web motor 240 is high is cancelled. However, in a case in which the state in which the torque of the web motor 240 is high is not cancelled even if the processing in steps S601 to S608 is repeated and the repetition count of the processing reaches the upper limit, the CPU 151 judges that some kind of abnormality has occurred in the web 212. In this case, the CPU 151 displays a replacement message prompting replacement of the web 212 on the operation unit 180 in step S611, and terminates the processing according to the procedures in FIGS. 5 and 6.

As described above, the image forming apparatus 100 according to the present embodiment includes the fixing roller 201 (fixing member), the recovery roller 204, and the cleaning unit 210, which includes the web 212, the supplying roller 211, the winding roller 214, and the pressing roller 213. The web motor 240 is configured so as to drive the winding roller 214. The load driving circuit 153 includes the torque detection unit 154, which detects the torque of the web motor 240, and is configured so as to drive the web motor 240. The CPU 151 causes the load driving circuit 153 to stop the driving of the web motor 240 when the torque detection value output from the torque detection unit 154 while the web motor 240 is being driven exceeds the threshold.

In such a manner, the CPU 151 stops the driving of the web motor 240 upon detecting a state in which the torque (the force of friction between the web 212 and the recovery roller 204) of the web motor 240 is high while the recovery roller 204 is being cleaned by the web 212. That is, even if the amount of toner adhering onto the recovery roller 204 increases and the force of friction between the web 212 and the recovery roller 204 increases, tearing of the web 212 (cleaning web) can be prevented by stopping the driving of the web motor 240. In other words, according to the present embodiment, tearing of the web 212 (cleaning web) can be prevented even if the amount of toner adhering onto the recovery roller 204 increases.

Also, as exemplified in the present embodiment, the CPU 151 may perform the attachment/detachment operation, in which the recovery roller 204 is switched from the contact state to the non-contact state and further switched from the non-contact state to the contact state, after the driving of the web motor 240 is stopped (steps S601 and S604). Furthermore, while the recovery roller 204 is in the non-contact state with respect to the web 212, the CPU 151 may cause the load driving circuit 153 to drive the web 212 for a predetermined amount of time (step S603). By performing such a control, the state in which the torque (the force of friction between the web 212 and the recovery roller 204) of the web motor 240 is high can be cancelled.

Furthermore, the CPU 151 may execute a predetermined number of iterations of the above-described attachment/detachment operation of the recovery roller 204 (step S606). In addition, after the predetermined number of iterations of the attachment/detachment operation is executed, the CPU 151 may cause the load driving circuit 153 to drive the web motor 240 for a predetermined amount of time (step S608), and repeatedly execute the predetermined number of iterations of the attachment/detachment operation until the torque detection value output from the torque detection unit 154 while the web motor 240 is being driven falls below the threshold ("YES" in step S609). Thus, tearing of the web 212 (cleaning web) can be prevented more reliably. Furthermore, tearing of the web 212 (cleaning web) can be prevented using a relatively simple configuration (inexpensive configuration).

Second Embodiment

In the second embodiment, an example will be described in which the refreshing operation is performed by switching the recovery roller 204 from the contact state to the non-contact state and switching the refreshing roller 220 from the non-contact state to the contact state with respect to the fixing roller 201 after the driving of the web motor 240 is stopped. In the following, description will be provided mainly focusing on the differences from the first embodiment, and description will be omitted for portions that are the same as the first embodiment.

The execution procedure of a print job in the image forming apparatus 100 according to the present embodiment is similar to that in the first embodiment (FIG. 5). However, the recovery processing (step S510), which is executed if the torque detection value of the web motor 240 is greater than or equal to the threshold ("NO" in step S504), is executed according to the procedure in FIG. 7.

Figure 7:
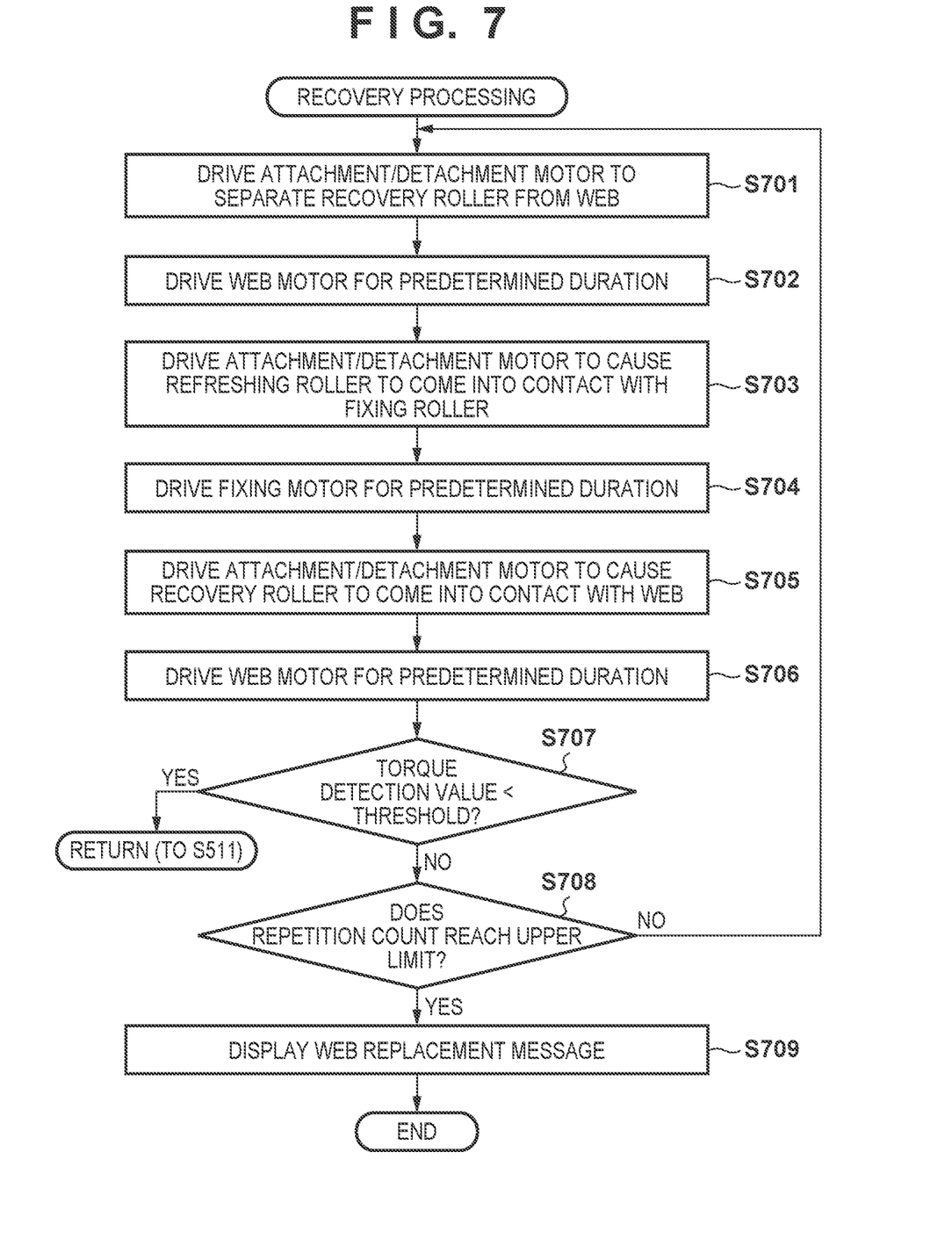
FIG. 7 is a flowchart illustrating a procedure of the recovery processing (S510) (second embodiment).

In the recovery processing (step S510), first, in step S701, the CPU 151 causes the load driving circuit 153 to drive the attachment/detachment motor 241 in the direction in which the recovery roller 204 is separated from the web 212, as illustrated in FIG. 7. By driving the attachment/detachment motor 241 until the output from the attachment/detachment sensor 242 switches from the ON signal to the OFF signal, the CPU 151 places the recovery roller 204 in the non-contact state (non-pressing state) from the contact state (pressing state). Once the output from the attachment/detachment sensor 242 switches to the OFF signal, the CPU 151 stops the driving of the attachment/detachment motor 241.

Next, in step S702, while the recovery roller 204 is in the non-contact state with respect to the web 212, the CPU 151 causes the load driving circuit 153 to drive the web motor 240 for a predetermined amount of time. By the winding operation of the web 212 by the winding roller 214, which is driven by the web motor 240, being performed in such a manner, the state in which the torque (the force of friction between the web 212 and the recovery roller 204) of the web motor 240 is high may be cancelled.

Furthermore, the CPU 151 performs the refreshing operation using the refreshing roller 220. Specifically, in step S703, the CPU 151 causes the load driving circuit 153 to drive the attachment/detachment motor 245 in the direction in which the refreshing roller 220 comes in contact with the fixing roller 201. By driving the attachment/detachment motor 245 until the output from the refreshing sensor 243 switches from the OFF signal to the ON signal, the CPU 151 places the refreshing roller 220 in the contact state (pressing state) from the non-contact state (non-pressing state). Once the output from the refreshing sensor 243 switches to the ON signal, the CPU 151 stops the driving of the attachment/detachment motor 245.

Subsequently, in step S704, the CPU 151 causes the load driving circuit 153 to drive the fixing motor 244 for a predetermined amount of time while the refreshing roller 220 is in the contact state with respect to the fixing roller 201. By such a refreshing operation being performed, toner adhering onto the fixing roller 201 is removed by the refreshing roller 220. By removing toner adhering onto the fixing roller 201 in such a manner, the amount of toner recovered by the recovery roller 204 from the fixing roller 201 can be reduced, and an increase in the force of friction between the web 212 and the recovery roller 204 can be suppressed.

After the above-described refreshing operation is completed, in step S705, the CPU 151 causes the load driving circuit 153 to drive the attachment/detachment motor 241 in the direction in which the recovery roller 204 comes into contact with the web 212. By driving the attachment/detachment motor 241 until the output from the attachment/detachment sensor 242 switches from the OFF signal to the ON signal, the CPU 151 places the recovery roller 204 in the contact state (pressing state) from the non-contact state (non-pressing state). Once the output from the attachment/detachment sensor 242 switches to the ON signal, the CPU 151 stops the driving of the attachment/detachment motor 241.

Furthermore, in step S706, the CPU 151 causes the load driving circuit 153 to drive the web motor 240 for a predetermined amount of time while the recovery roller 204 is in the contact state with respect to the web 212. Thus, toner adhering onto the recovery roller 204 is removed using the web 212.

Subsequently, in step S707, the CPU 151 determines whether or not the torque detection value, which is output from the torque detection unit 154 and indicates the torque (load torque) of the web motor 240, is below the threshold. Thus, the CPU 151 checks whether the state in which the torque (the force of friction between the web 212 and the recovery roller 204) of the web motor 240 is high has been cancelled. The CPU 151 terminates the processing according to the procedure in FIG. 7 and advances processing to step S511 if the torque detection value is below the threshold, and advances processing to step S708 if the torque detection value is greater than or equal to the threshold.

In step S708, the CPU 151 determines whether or not the execution count (repetition count) of the processing in steps S701 to S706 has reached a predetermined upper limit. In the present embodiment, the processing in steps S701 to S706 is repeatedly executed until the state in which the torque (the force of friction between the web 212 and the recovery roller 204) of the web motor 240 is high is cancelled. However, in a case in which the state in which the torque of the web motor 240 is high is not cancelled even if the processing in steps S701 to S706 is repeated and the repetition count of the processing reaches the upper limit, the CPU 151 judges that some kind of abnormality has occurred in the web 212. In this case, the CPU 151 displays a replacement message prompting replacement of the web 212 on the operation unit 180 in step S709, and terminates the processing according to the procedures in FIGS. 5 and 7.

Once the processing according to the procedure in FIG. 7 (step S510) is completed, the CPU 151 performs processing similar to that in the first embodiment in and after step S511.

As described above, in the image forming apparatus 100 according to the present embodiment, the CPU 151 causes the load driving circuit 153 to stop the driving of the web motor 240 when the torque detection value output from the torque detection unit 154 while the web motor 240 is being driven exceeds the threshold. After the driving of the web motor 240 is stopped, the CPU 151 switches the recovery roller 204 from the contact state to the non-contact state with respect to the web 212 (step S701). Furthermore, the CPU 151 switches the refreshing roller 220 from the non-contact state to the contact state with respect to the fixing roller 201 (step S703), and performs the refreshing operation of the recovery roller 204 (step S704).

By performing the refreshing operation of the recovery roller 204 while the driving of the web motor 240 is stopped in such a manner, the state in which the torque (the force of friction between the web 212 and the recovery roller 204) of the web motor 240 is high can be cancelled. Accordingly, tearing of the web 212 (cleaning web) can be prevented even if the amount of toner adhering onto the recovery roller 204 increases. Furthermore, tearing of the web 212 (cleaning web) can be prevented using a relatively simple configuration (inexpensive configuration).

<Modifications>

A configuration in which the fixing device 200 includes the fixing roller 201 and the pressing roller 202 is used in the above-described embodiments. However, there is no limitation to this, and a fixing belt may be used in place of a fixing roller. Also, a pressing belt may be used in place of a pressing roller.

Furthermore, the torque of the web motor 240 is detected based on the q-axis-current current value iq used in the vector control in the load driving circuit 153. However, the torque of the web motor 240 may be detected using a configuration that is different from this. For example, if a solenoid is used to wind the web 212, the torque of the web motor 240 may be detected based on a detection of a difference in solenoid magnetization time. Alternatively, the torque of the web motor 240 may be detected based on a detection result of phase currents of the stepping motor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-126878, filed Aug. 2, 2021, which is hereby incorporated by reference herein in its entirety.

What is claimed is:

1. An image forming apparatus comprising:
a fixing rotator that fixes, onto a recording material, a toner image that has been transferred onto the recording material;
a recovery roller that recovers toner adhering onto the fixing rotator;
a cleaning unit that includes: (1) a cleaning web that cleans the recovery roller; (2) a first roller around which the cleaning web is wound; (3) a second roller that winds the cleaning web supplied from the first roller; and (4) a third roller that presses the cleaning web against the recovery roller to clean the recovery roller, the cleaning web being fed from the first roller toward the second roller as the second roller rotates;
a motor that drives the second roller;
a controller, including (1) one or more processors which execute instructions stored in a memory, (2) one or more circuits, or (3) a combination of the one or more processors and the one or more circuits, being configured to control a rotation of a rotor of the motor by controlling a driving current flowing through a winding of the motor; and
a detector configured to detect the driving current flowing through the winding,
wherein the controller determines a rotational phase of the rotor,
wherein the controller controls the rotation of the rotor based on a torque current component that generates torque in the rotor and is represented in a rotating coordinate system based on the rotational phase, and an excitation current component that affects an intensity of magnetic flux penetrating the winding and is represented in the rotating coordinate system, and
wherein the controller stops the rotation of the motor in a case where a value of the torque current component of the driving current detected by the detector exceeds a threshold while the rotor is rotating.

2. The image forming apparatus according to claim 1, wherein the recovery roller can be switched between a contact state in which the recovery roller is in contact with the cleaning web and a non-contact state in which the recovery roller is separated from the cleaning web, and,
wherein after the rotation of the motor is stopped, the controller executes an attachment/detachment operation in which the recovery roller is switched from the contact state to the non-contact state and further switched from the non-contact state to the contact state.

3. The image forming apparatus according to claim 2, wherein while the recovery roller is in the non-contact state, the controller causes the rotor of the motor to rotate for a predetermined amount of time.

4. The image forming apparatus according to claim 1, further comprising a refreshing roller that can be switched between a contact state in which the refreshing roller is in contact with the fixing rotator and a non-contact state in which the refreshing roller is separated from the fixing rotator, and that is used in the contact state to perform a refreshing operation on the fixing rotator,
wherein the recovery roller can be switched between a contact state in which the recovery roller is in contact with the cleaning web and a non-contact state in which the recovery roller is separated from the cleaning web, and
wherein after the rotation of the motor is stopped, the controller executes the refreshing operation by switching the recovery roller from the contact state to the non-contact state and switching the refreshing roller from the non-contact state to the contact state.

5. The image forming apparatus according to claim 4, wherein after the refreshing operation is completed, the controller switches the recovery roller from the non-contact state to the contact state, causes the rotor of the motor to rotate for a predetermined amount of time, and repeatedly executes the refreshing operation until the value corresponding to the torque applied to the rotor falls below the threshold while the rotor is rotating.

6. The image forming apparatus according to claim 5, wherein the controller determines that an abnormality has occurred in the cleaning web when a repetition count of the refreshing operation reaches an upper limit.

7. An image forming apparatus comprising:
a fixing rotator that fixes, onto a recording material, a toner image that has been transferred onto the recording material;
a recovery roller that recovers toner adhering onto the fixing rotator;
a cleaning unit that includes: (1) a cleaning web that cleans the recovery roller; (2) a first roller around which the cleaning web is wound; (3) a second roller that winds the cleaning web supplied from the first roller; and (4) a third roller that presses the cleaning web against the recovery roller to clean the recovery roller, the cleaning web being fed from the first roller toward the second roller as the second roller rotates;
a motor that drives the second roller;
a controller, comprising (1) one or more processors which execute instructions stored in a memory, (2) one or more circuits, or (3) a combination of the one or more processors and the one or more circuits, being configured to control a rotation of a rotor of the motor by controlling a driving current flowing through a winding of the motor; and
a detector configured to detect the driving current flowing through the winding,
wherein the recovery roller can be switched between a contact state in which the recovery roller is in contact with the cleaning web and a non-contact state in which the recovery roller is separated from the cleaning web,
wherein after the rotation of the motor is stopped, the controller executes an attachment/detachment operation in which the recovery roller is switched from the contact state to the non-contact state and further switched from the non-contact state to the contact state, and
wherein the controller executes a predetermined number of iterations of the attachment/detachment operation.

8. The image forming apparatus according to claim 7, wherein after the predetermined number of iterations of the attachment/detachment operation is executed, the controller causes the rotor of the motor to rotate for a predetermined amount of time, and repeatedly executes the predetermined number of iterations of the attachment/detachment operation until the value corresponding to the torque applied to the rotor falls below the threshold while the rotor is rotating.

9. The image forming apparatus according to claim 8, wherein the controller determines that an abnormality has occurred in the cleaning web when a repetition count of the predetermined number of iterations of the attachment/detachment operation reaches an upper limit.

10. The image forming apparatus according to claim 7, further comprising a phase determination device configured to determine a rotational phase of the rotor,
wherein the controller controls the rotation of the rotor based on a torque current component that generates torque in the rotor and is represented in a rotating coordinate system based on the rotational phase, and an excitation current component that affects an intensity of magnetic flux penetrating the winding and is represented in the rotating coordinate system, and
wherein the value corresponding to the torque applied to the rotor is a value of the torque current component of the driving current detected by the detector.

11. The image forming apparatus according to claim 7, further comprising a refreshing roller that can be switched between a contact state in which the refreshing roller is in contact with the fixing rotator and a non-contact state in which the refreshing roller is separated from the fixing rotator, and that is used in the contact state to perform a refreshing operation on the fixing rotator,
wherein the recovery roller can be switched between a contact state in which the recovery roller is in contact with the cleaning web and a non-contact state in which the recovery roller is separated from the cleaning web, and
wherein after the rotation of the motor is stopped, the controller executes the refreshing operation by switching the recovery roller from the contact state to the non-contact state and switching the refreshing roller from the non-contact state to the contact state.

* * * * *